(12) United States Patent
Frantz

(10) Patent No.: US 11,453,985 B1
(45) Date of Patent: Sep. 27, 2022

(54) AUTO RECALL USING AN ADJUSTABLE LEG STOP FOR A MILLING MACHINE

(71) Applicant: Caterpillar Paving Products Inc., Brooklyn Park, MN (US)

(72) Inventor: Matthew-David S. Frantz, Eden Prairie, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 17/224,770

(22) Filed: Apr. 7, 2021

(51) Int. Cl.
*E01C 23/088* (2006.01)
*E01C 23/12* (2006.01)

(52) U.S. Cl.
CPC .......... *E01C 23/088* (2013.01); *E01C 23/127* (2013.01); *E01C 2301/00* (2013.01)

(58) Field of Classification Search
CPC ... E01C 23/088; E01C 23/127; F15B 15/2807
See application file for complete search history.

(56) References Cited

U.S. PATENT DOCUMENTS

| 2,128,273 | A | | 8/1938 | Stevens |
| 2,755,776 | A | * | 7/1956 | Morris ............... F15B 15/2807 91/358 A |
| 4,176,586 | A | * | 12/1979 | Stoll ..................... F01L 25/08 91/DIG. 4 |
| 4,270,801 | A | | 6/1981 | Swisher, Jr. et al. |
| 6,152,648 | A | * | 11/2000 | Gfroerer ............... E01C 23/088 404/93 |
| 9,656,530 | B2 | | 5/2017 | Busley et al. |

* cited by examiner

*Primary Examiner* — Janine M Kreck
(74) *Attorney, Agent, or Firm* — Schwegman Lundberg & Woessner, P.A.

(57) ABSTRACT

A milling machine can include a frame; a rotor attached to the frame; vertically adjustable legs to raise and lower the rotor, each of the vertically adjustable legs with a track or wheel at a lower end to propel the milling machine; and a mechanism associated with at least one of the vertically adjustable legs to mechanically store and recall a leg height selected by an operator of the milling machine.

18 Claims, 6 Drawing Sheets

AUTO RECALL USING AN ADJUSTABLE LEG STOP FOR A MILLING MACHINE

TECHNICAL FIELD

This disclosure relates to road construction equipment, and more specifically to a milling machine.

BACKGROUND

Milling machines can include construction machines such as rotary mixers and cold planers. For example, rotary mixers are road construction machines that can be used to prepare or stabilize a roadbed, parking lot, soil bioremediation or similar applications. A rotary mixer can include a cutting rotor that can be raised or lowered with manual control inputs from an operator. Vertically adjustable legs or lifting columns are used to raise and lower the machine leg height.

Before, during, or after operating the machine, it can be useful for the operator to be able to save the machine leg height position, adjust away from the height as operating conditions change, and then to recall the machine back to the previous height position setting.

U.S. Pat. No. 9,656,530 describes a construction machine where each lifting column includes a device for measuring the actual vertical state of the lifting column.

SUMMARY

In an example according to this disclosure, a milling machine can include a frame; a rotor attached to the frame; vertically adjustable legs to raise and lower the rotor, each of the vertically adjustable legs with a track or wheel at a lower end to propel the milling machine; and a mechanism associated with one or more of the vertically adjustable legs to mechanically store and recall a leg height selected by an operator of the milling machine.

In one example, a method for storing and recalling a height position of a vertically adjustable component of a milling machine can include storing a height of a vertically adjustable leg of the milling machine by moving a sliding target operatively coupled to a hydraulic cylinder of the vertically adjustable leg and setting a movable proximity sensor to a height of the sliding target to define a set point; and if the height of the vertically adjustable leg has changed, recalling the set point by moving the hydraulic cylinder up or down until the sliding target reaches the level of the proximity sensor.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
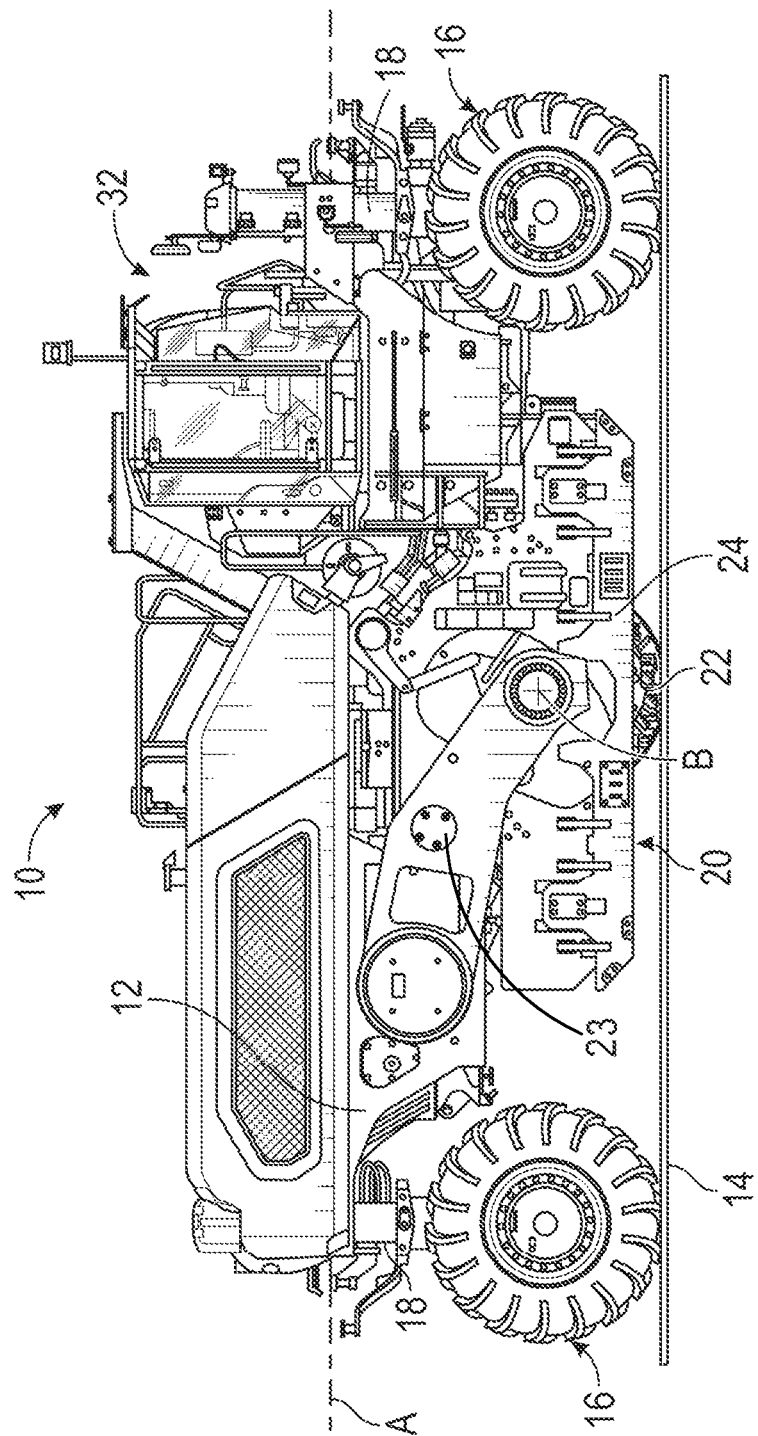
FIG. 1 shows a side view of a rotary mixer, in accordance with one embodiment.

FIG. 1 shows a side view of a milling machine 10, in this example, a rotary mixer, in accordance with one embodiment. The milling machine 10 can also be known as a reclaimer or a soil stabilizer. The milling machine 10 generally includes a frame 12, a milling assembly 20, including a rotor 22 attached to the frame 12, and transportation devices such as four wheels 16 attached to the frame 12 for moving the milling machine 10. In other embodiments, the transportation devices can be configured as track assemblies or crawlers. The milling machine 10 can also include a power source such as a diesel engine, which drives the various components, and an operator station 32 which can include various controls to control the operations of the milling machine 10.

The milling assembly 20 can comprise the rotor 22 and a housing 24. The rotor 22 (sometimes called a milling drum or drum) is rotatable relative to the frame 12 and a surface 14 and is operatively connected to be driven by the power source.

The rotor 22 can include a plurality of cutting tools, such as chisels or bits, disposed thereon. The rotor 22 can be rotated within the housing 24 about axis B extending in a direction perpendicular to frame axis A into the plane of FIG. 1. As the rotor 22 spins or rotates about axis B, the cutting tools may engage the surface 14, such as, for example, asphalt and concrete, of existing roadways, bridges, parking lots and the like. Moreover, as the cutting tools engage such the surface 14, the cutting tools remove layers of materials forming work surface, such as hardened dirt, rock, or pavement. The spinning action of the rotor 22 and the cutting tools pulverizes and mixes an existing road surface (surface 14) and a predetermined amount of the underlying material in a rotor chamber formed by the housing 24 to create a new base or a new road surface. Various additives or aggregates can be deposited on surfaces (including surface 14) by the action of the rotor 22 and the cutting tools.

The wheels 16 can be connected to the frame 12 via a plurality of vertically adjustable legs 18 (also referred to as lifting columns). In the present example, the milling machine 10 includes four vertically adjustable legs 18. Although the present application is described with reference to a rotary mixer, the present system is applicable to other types of milling machines using vertically adjustable legs, such as cold planer machines.

The vertically adjustable legs 18 can each include actuators such as a hydraulic lifting column configured to raise and lower frame 12, relative to the wheels 16. A pivot arm 23 is coupled to the frame 12 and to the rotor 22. The operator can provide for a given cutting depth of the rotor 22 by adjusting the heights of the legs 18 and by moving the pivot arm 23 to set a desired cutting depth of the rotor 22 of the milling assembly 20 and to accommodate milling machine 10 engaging obstacles on the ground. It is noted that for a cold planer, the cutting depth of the cutting rotor is determined by the leg/frame height, since cold planers do not usually include pivot arms for the rotor.

Figure 2:
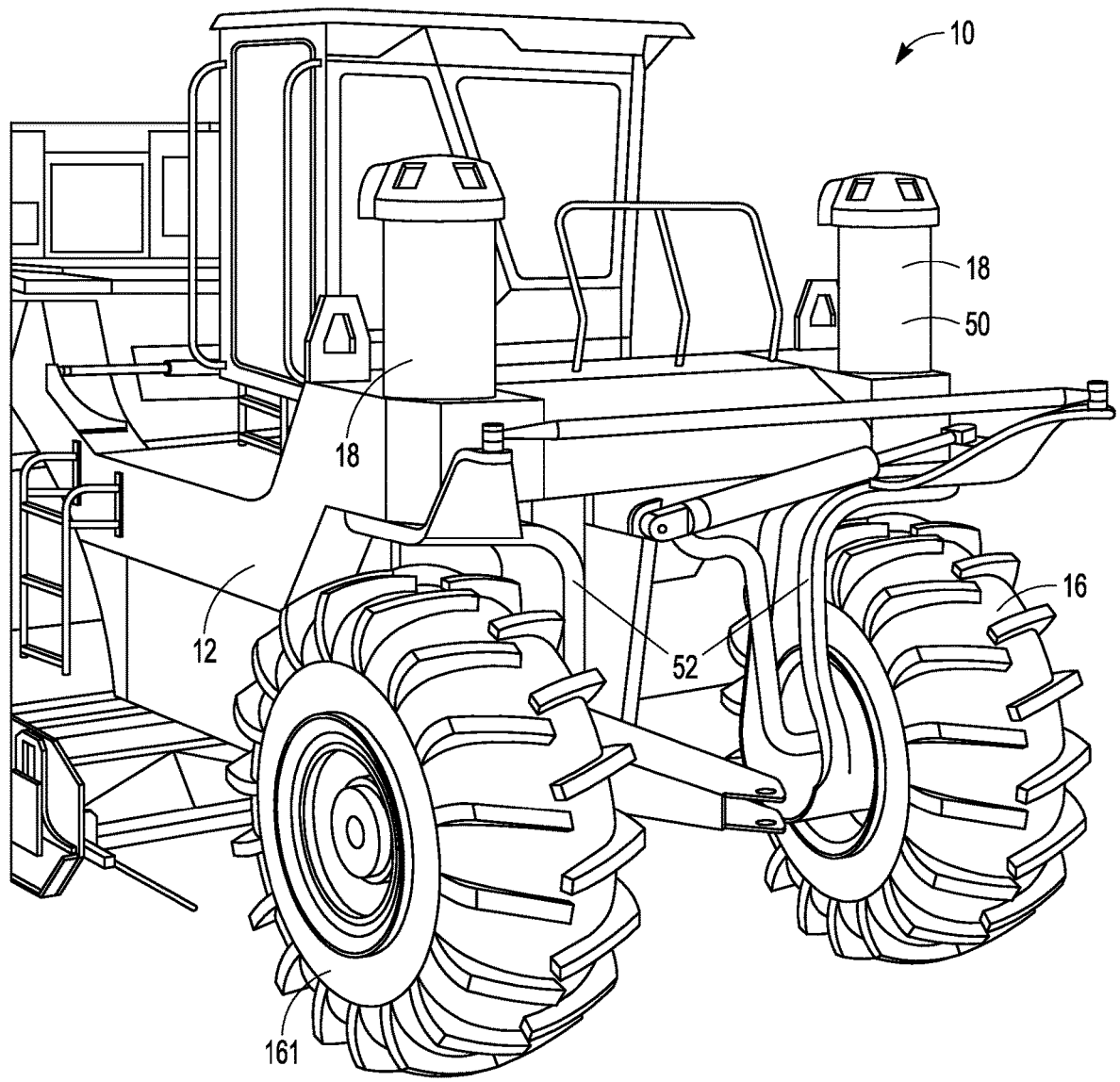
FIG. 2 shows a front perspective of a rotary mixer, in accordance with one embodiment.
Figure 3:
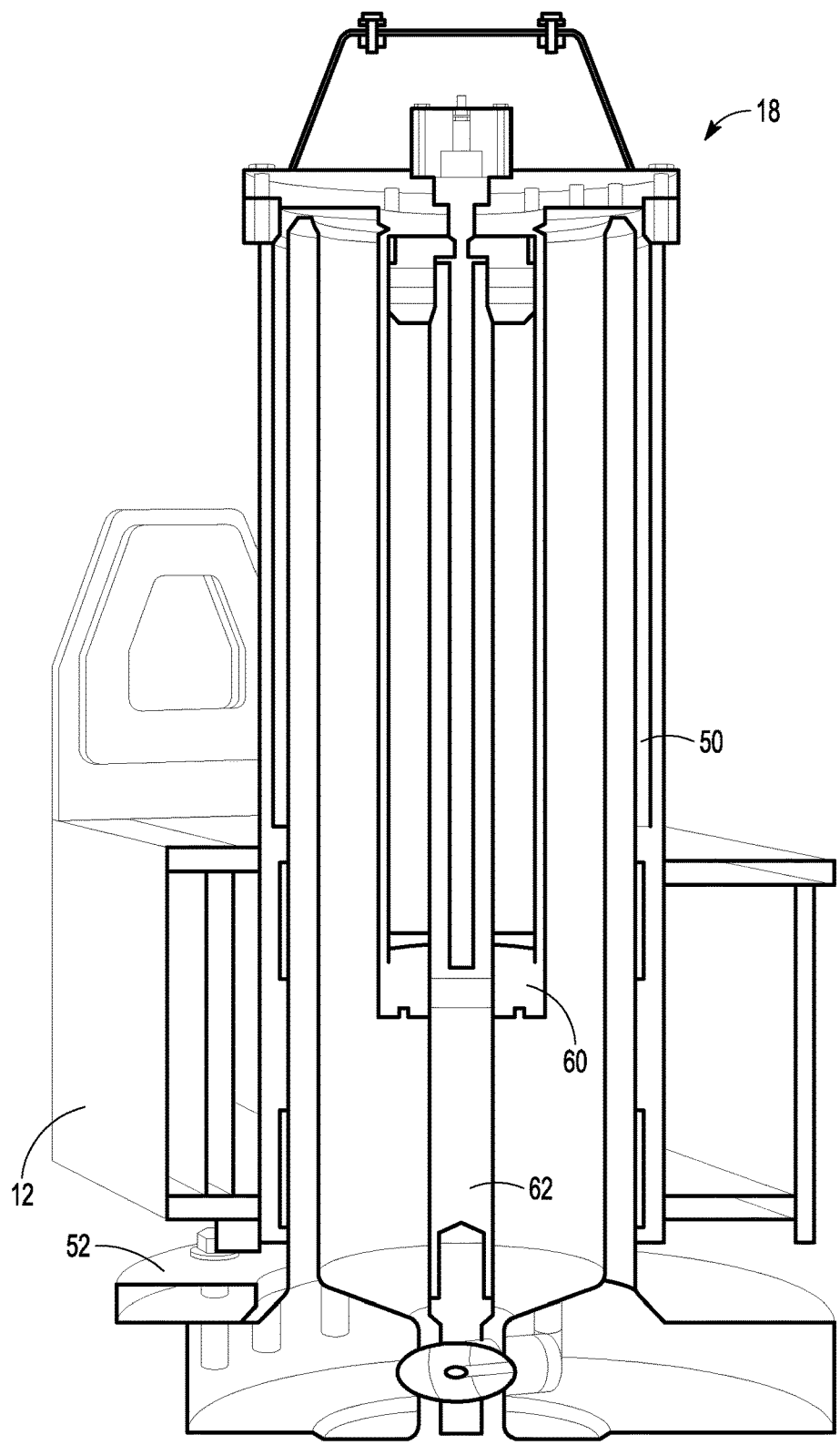
FIG. 3 shows a cross-section view of a vertically adjustable leg, in accordance with one embodiment.

FIGS. 2, 3 show more details of the vertically adjustable legs 18 of the milling machine 10. FIG. 2 shows a front perspective of the rotary mixer, in accordance with one embodiment; and FIG. 3 shows a cross-section view of the vertically adjustable leg 18, in accordance with one embodiment.

Each of the vertically adjustable legs 18 includes a leg tube 50 attached to the frame 12 and a hydraulic cylinder 60 attached to and located within the leg tube 50 so as to be axially aligned with the leg tube 50. The hydraulic cylinder 60 includes an extendable hydraulic rod 62 that is connected to the wheels 16 via a wheel frame 52, which can be moved independently from the machine frame 12. As the hydraulic rod 62 of the hydraulic cylinder 60 raises and lowers, the frame 12, and thus the rotor 22, rise and fall relative to the wheel frame 52 and the wheels 16.

As noted above, during operating the milling machine 10, it can be useful for the operator to be able to save the machine leg height position, adjust away from the height as operating conditions change, and then to recall the machine back to the previous height position setting.

The present system provides a mechanism and method to use a single or multiple adjustable stopping points that the operator or an automated machine height control system can easily return to. Additionally, the system performs the recall function without needing to take any measurements of the relative position of the hydraulic cylinder, the connected components, the working surface, earthly position, or gravity. Thus, this design provides a way to provide a leg height recall function on a milling machine without the need for integrated leg sensors.

Figure 4:
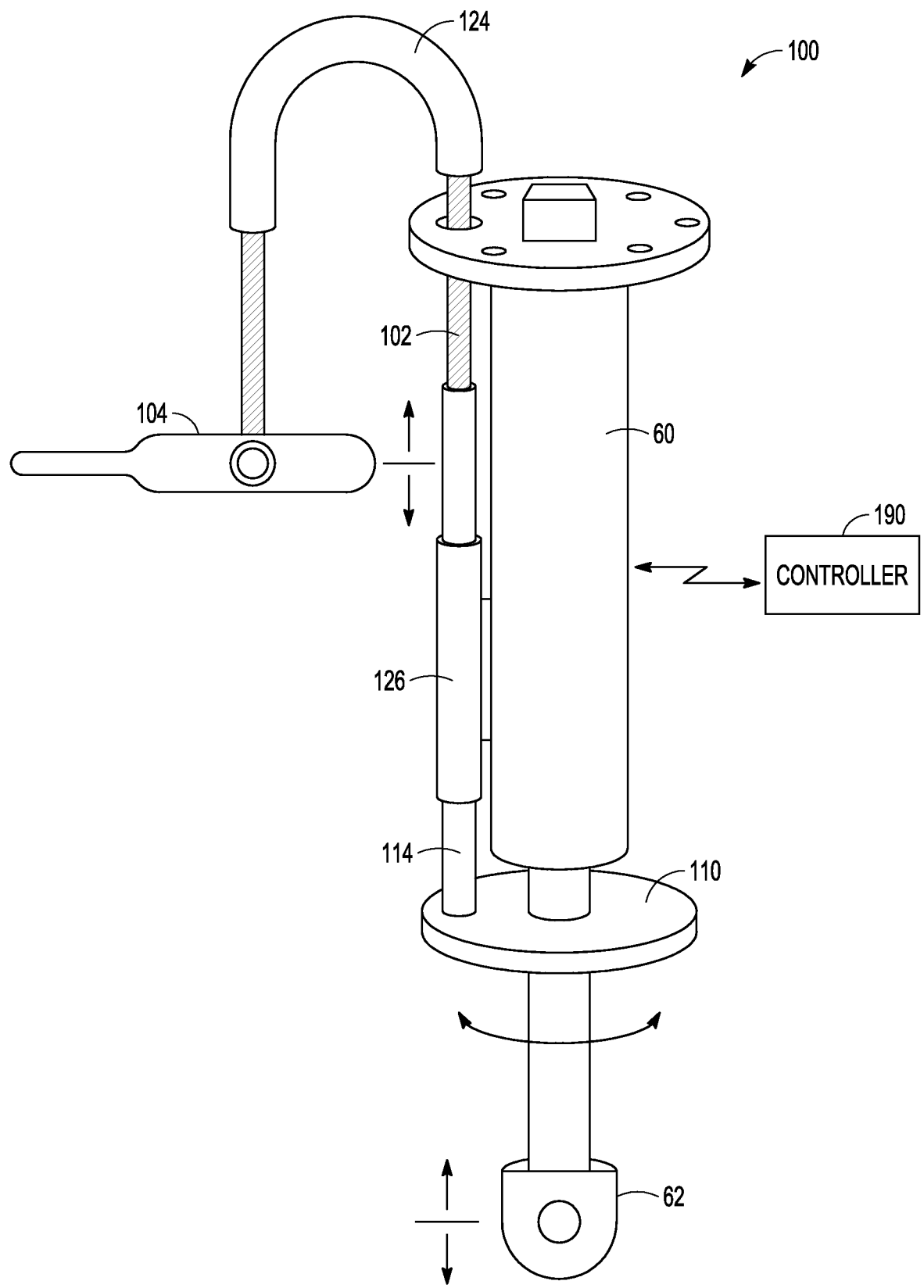
FIG. 4 shows a view of a portion of a mechanism for storing and recalling a machine height, in accordance with one embodiment.
Figure 5:
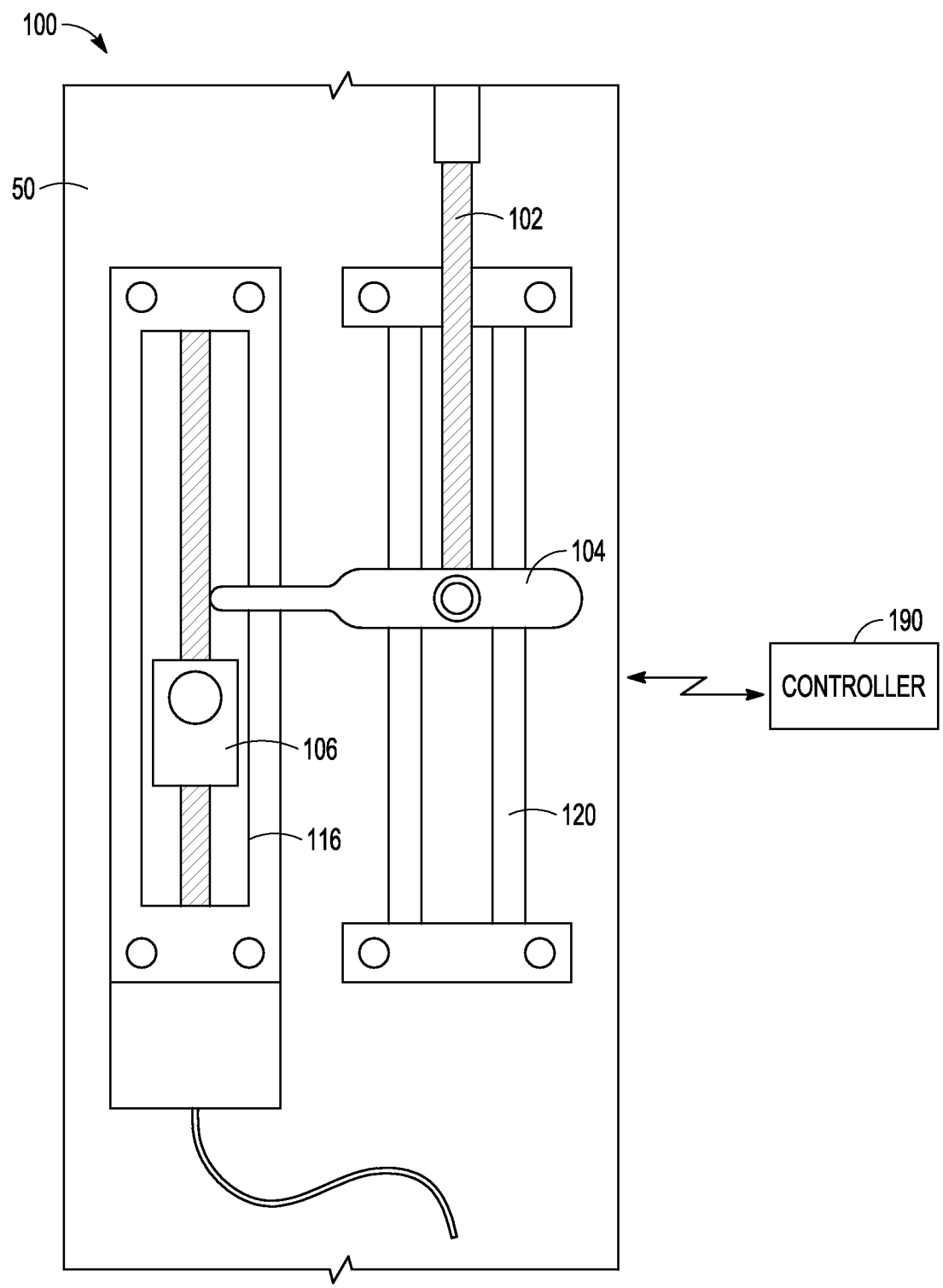
FIG. 5 shows a view of a second portion of the mechanism for storing and recalling a machine height, in accordance with one embodiment.

FIG. 4 shows a view of a portion of a mechanism 100 for storing and recalling a machine height, in accordance with one embodiment, and FIG. 5 shows a view of a second portion of the mechanism 100 for storing and recalling a machine height.

The mechanism 100 can be associated with each of the vertically adjustable legs 18 to mechanically store and recall a leg height selected by the operator of the milling machine 10. The mechanism 100 can allow the operator to mechanically set and recall adjustable stopping points or set points for leg height control without the need to take any measurements, such as using integrated leg sensors, on the milling machine 10.

In this example, the mechanism 100 can include a cable 102 operatively coupled to the hydraulic cylinder 60, located within the vertically adjustable leg 18, to raise and lower a sliding target 104 adjacent a movable inductive proximity sensor 106. The sliding target 104 rises and lowers as the hydraulic rod 62 of hydraulic cylinder 60 rises and lowers. In other words, the sliding target 104 is in synch with the actions of the hydraulic cylinder 60. If the hydraulic cylinder 60 moves, the sliding target 104 moves.

In use, when the leg 18 is at a desired height the operator can command the proximity sensor 106 to move to the position of the sliding target 104 to define a set point. The sliding target 104 is configured to pass over the proximity sensor 106 mounted on an electrically driven linear actuator 116, and the proximity sensor 106 is coupled to a controller 190 to let the controller 190 know when the siding target 104 and the proximity sensor 106 are aligned. In various examples, the proximity sensor can include a mechanical switch, an ultrasonic sensor, a laser sensor, a camera imaging system, or other sensing technology to sense a discrete position of the sliding target 104 and relay that information to the controller 190.

Later, after changing the leg height for various reasons (and therefore moving the sliding target 104 away from the set point), the operator can recall the set point position that is mechanically "stored" by the proximity sensor 106. Then the milling machine 10 is configured to operate the hydraulic cylinder 60 to raise or lower the sliding target 104 until the sliding target 104 re-aligns with the proximity sensor 106 at the set point.

In this example, a collar 110 can be coupled to the hydraulic rod 62 so as to move with the cylinder rod 62. A sliding mechanism rod 114 can be coupled at one end to the collar 110 and at a second end to a first end of the cable 102. The sliding rod 114 can go through a rod guide 126, such as a tube, which is connected to the outside of the hydraulic cylinder 60. The cable 102 can be coupled at a second end to the sliding target 104 on a linear slide 120 located outside the leg tube 50 of the vertically adjustable leg 18. In one example, the cable 102 can be routed to the outside of the leg tube 50 via a U-shaped cable tube 124 that routes the cable 102 out of the vertically adjustable leg 18 and to the outside of the leg tube 50. The sliding target 104 vertically slides up and down the linear slide 120 as the sliding target 104 is pulled or pushed by the cable 102. In one example, both the sliding target 104 and the proximity sensor 106 are mounted to an outside of the leg tube 50.

In this example, the movable proximity sensor 106 can be located on an electrically driven linear actuator 116. The linear actuator 116 can be operatively coupled to the controller 190 of the milling machine so that the proximity sensor 106 can be raised or lowered as desired. The position of the proximity sensor 106 at any given moment defines the set point of the mechanism 100. As noted, the operator can change the set point at any time by declaring a new set point when the operator is satisfied with the leg height. Then the proximity sensor 106 will move to the height of the sliding target 104. Likewise, if the operator has raised or lowered the legs for various reasons, the operator can recall the previous set point position so that the milling machine will raise or lower the hydraulic cylinder 60 until the sliding target 104, which moves in synch with the hydraulic cylinder 60, aligns with the proximity sensor 106 at the set point.

Accordingly, in use, as the operator raises and lowers the legs 18 using the machine controls and hydraulic system, the machine height and rotor are set to a position that the operator finds suitable. The operator then, using the machine controls, commands the linear actuator 116 to raise or lower the proximity sensor 106 until the machine controller 190 see an input from the proximity sensor 106, as caused by being aligned with the sliding target 104. Upon seeing an input from the proximity sensor 106, the machine controller 190 can stop commanding the linear actuator to move the proximity sensor 106, and the location of the proximity sensor 106 is the new set point.

Afterwards, if the leg height is adjusted away from the saved location (set point) of the proximity sensor 106, the operator can command the machine controls to raise or lower the hydraulic leg cylinders until seeing an input from the proximity sensor 106, thereby recalling the saved position.

In various examples, the mechanism 100 could include a plurality of proximity sensors 106 to provide a plurality of different set points. Moreover, the present system is applicable to other milling machine leg height controls, such as for cold planers.

It is also applicable to other hydraulic cylinder actuated attachments or mechanisms requiring an adjustable stop without the use of a direct or indirect measurement of hydraulic cylinder rod position.

Also, in other embodiments, the linear actuator 116 and the linear slide 120 can be positioned adjacent and parallel to each other, but not situated vertically on the leg tube. In this example, the cable 102 can be routed through a more extensive tube structure allowing the linear actuator 116 and the linear slide 120 to be positioned in an alternate position on the machine frame. Further it is noted that the linear actuator 116 and linear slide 120 are not limited to vertical motion and can have any orientation.

INDUSTRIAL APPLICABILITY

The present system is applicable to a milling machine, such as a rotary mixer, used for various applications such as full-depth reclamation or soil stabilization. Moreover, any machine using hydraulic actuation can use the system described herein for mechanically storing and recalling machine set points.

Figure 6:
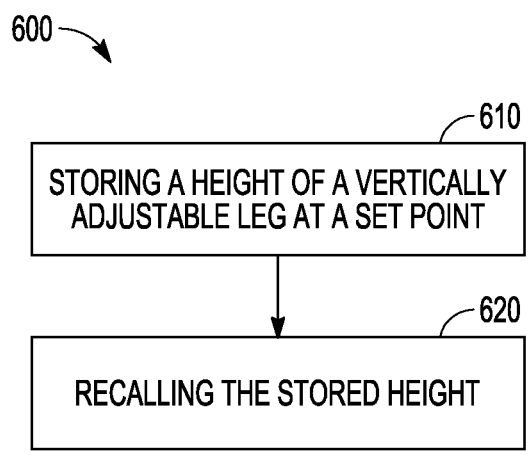
FIG. 6 shows a schematic of a flow chart for a method, in accordance with one embodiment.

For example, FIG. 6 shows a flow chart of a method 600 for storing and recalling a height position of a vertically adjustable component of a milling machine, using the mechanism 100 as discussed above. The method 600 includes storing (610) a height position of a vertically adjustable component of the milling machine by moving a sliding target operatively coupled to a hydraulic cylinder of the vertically adjustable component and then setting a movable proximity sensor to a height of the sliding target to define the set point. The method 600 further includes recalling 620 the stored height position if the height of the vertically adjustable component has changed by moving the hydraulic cylinder up or down until the sliding target reaches the level of the proximity sensor.

Referring to FIGS. 4-5, in some embodiments the method 600 can include using a cable 102 operatively coupled to the hydraulic cylinder 60 within a vertically adjustable leg 18 to raise and lower the sliding target 104 which is adjacent the movable proximity sensor 106. Further, an operator can command the proximity sensor 106 to move to the position of the sliding target 104 to define the set point. If the height of the vertically adjustable leg has been changed, the operator can recall the set point position and the hydraulic cylinder 60 can raise and lower the sliding target 104 until the sliding target 104 aligns with the proximity sensor 106 at the set point.

In summary, in operation, the operator uses manual controls to set the leg heights while the linear sliding target 104 raises and lowers proportional to the stroke of the hydraulic cylinder rod 62. Then the operator presses a save settings button and the controller 190 commands the linear actuator 116 to raise or lower until the proximity sensor 106 senses the sliding target 104. When the proximity sensor 106 senses the sliding target 104, the controller 190 stops commanding linear actuator movement.

Then the operator can run the machine using the manual controls, typically adjusting the leg heights away from the position last sensed by the proximity sensor. Then, the operator can press an auto recall button and the controller 190 commands the hydraulic system to raise or lower the legs 18 until the controller sees an input from the proximity sensor 106 that the proximity sensor 106 is aligned with the sliding target 104. When the controller 190 receives a signal that the proximity sensor 106 sees the sliding target 104, the controller 190 stops commanding leg movement.

The present system provides a method to use a single or multiple adjustable stopping point(s) that the operator or automated machine height control system can easily drive to. Additionally, the system performs the auto recall function without needing to take any measurements of relative position of the hydraulic cylinder, connected components, working surface, earthly position, or gravity. This design is a way to provide a recall function on a machine without the need for integrated leg sensors.

Various examples are illustrated in the figures and foregoing description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. A milling machine, comprising:
    a frame;
    a rotor attached to the frame;
    vertically adjustable legs to raise and lower the rotor, each of the vertically adjustable legs with a track or wheel at a lower end to propel the milling machine; and
    a mechanism associated with at least one of the vertically adjustable legs to mechanically store and recall a leg height selected by an operator of the milling machine, wherein the mechanism includes a sliding target configured to move in synch with a hydraulic cylinder located within the vertically adjustable leg, wherein the sliding target is coupled to a flexible cable which is operatively coupled to the hydraulic cylinder within the vertically adjustable leg.

2. The milling machine of claim 1, wherein the mechanism further includes a movable proximity sensor located adjacent to the sliding target, wherein the operator can command the proximity sensor to move to a position of the sliding target to define a set point.

3. The milling machine of claim 2, wherein the operator can recall the set point and wherein the milling machine is configured to raise or lower the vertically adjustable legs until the sliding target aligns with the proximity sensor at the set point.

4. A milling machine, comprising:
    a frame;
    a rotor attached to the frame;
    vertically adjustable legs to raise and lower the rotor, each of the vertically adjustable legs with a track or wheel at a lower end to propel the milling machine; and
    a mechanism associated with at least one of the vertically adjustable legs to mechanically store and recall a leg height selected by an operator of the milling machine, wherein the mechanism includes a sliding target configured to move in synch with a hydraulic cylinder of the vertically adjustable leg, wherein the mechanism includes a cable operatively coupled to the hydraulic cylinder within the vertically adjustable leg, wherein the hydraulic cylinder includes a cylinder rod and a collar is coupled to the cylinder rod, and wherein a mechanism rod is coupled at one end to the collar and at a second end to a first end of the cable.

5. The milling machine of claim 4, wherein the cable is coupled at a second end to the sliding target on a linear slide located outside the vertically adjustable leg, and wherein the sliding target slides back and forth along the linear slide as the sliding target is pulled or pushed by the cable.

6. The milling machine of claim 5, wherein the mechanism further includes a movable proximity sensor located on a linear actuator that is configured to move the movable proximity sensor.

7. The milling machine of claim 6, wherein the position of the proximity sensor defines a set point.

8. The milling machine of claim 7, wherein the operator can recall the set point position wherein the milling machine is configured to raise or lower the hydraulic cylinder until the sliding target aligns with the proximity sensor at the set point.

9. The milling machine of claim 1, wherein the milling machine includes a rotary mixer including a pivot arm coupled to the rotor.

10. A method for storing and recalling a height position of a vertically adjustable component of a milling machine, the method comprising:
    storing a height position of a vertically adjustable leg of the milling machine by moving a sliding target operatively coupled to a hydraulic cylinder of the vertically adjustable leg and setting a movable proximity sensor to a height of the sliding target to define a set point; and
    if the height position of the vertically adjustable leg has changed, recalling the set point by moving the hydraulic cylinder up or down until the sliding target reaches the level of the proximity sensor;
    wherein moving the sliding target includes using a cable operatively coupled to the hydraulic cylinder within the vertically adjustable leg to move the sliding target which is located adjacent the movable proximity sensor.

11. The method of claim 10, wherein an operator can command the proximity sensor to move to the position of the sliding target to define the set point.

12. The method of claim 11, wherein the operator can recall the set point position and the hydraulic cylinder can raise and lower until the sliding target aligns with the proximity sensor at the set point.

13. The method of claim 10, wherein the hydraulic cylinder includes a cylinder rod and a collar is coupled to the cylinder rod, and wherein a mechanism rod is coupled at one end to the collar and at a second end to a first end of the cable.

14. The method of claim 13, wherein the cable is coupled at a second end to the sliding target on a linear slide located outside the vertically adjustable leg such that the sliding target slides back and forth along the linear slide as the sliding target is pulled or pushed by the cable.

15. The method of claim 14, wherein the movable proximity sensor is located on a linear actuator that is configured to move the proximity sensor.

16. The method of claim 15, wherein the movable proximity sensor is located outside the vertically adjustable leg.

17. The method of claim 16, wherein the sliding target and the proximity sensor are mounted to an outside of a leg tube of the vertically adjustable leg.

18. The method of claim 10 wherein the milling machine includes a rotary mixer including a frame, a rotor attached to the frame, and the vertically adjustable leg and a pivot arm to raise and lower the rotor, the vertically adjustable leg with a track or wheel at a lower end to propel the milling machine.

* * * * *